(12) United States Patent
Hundemer

(10) Patent No.: US 9,747,950 B2
(45) Date of Patent: Aug. 29, 2017

(54) USE OF PROGRAM-SCHEDULE TEXT AND CLOSED-CAPTIONING TEXT TO FACILITATE SELECTION OF A PORTION OF A MEDIA-PROGRAM RECORDING

(71) Applicant: Tribune Broadcasting Company, LLC, Chicago, IL (US)

(72) Inventor: Hank Hundemer, Bellevue, KY (US)

(73) Assignee: TRIBUNE BROADCASTING COMPANY, LLC, Chicago, IL (US)

( * ) Notice: Subject to any disclaimer, the term of this patent is extended or adjusted under 35 U.S.C. 154(b) by 55 days.

(21) Appl. No.: 14/627,119

(22) Filed: Feb. 20, 2015

(65) Prior Publication Data

US 2016/0247539 A1 Aug. 25, 2016

(51) Int. Cl.
*H04N 5/92* (2006.01)
*G11B 27/28* (2006.01)
(Continued)

(52) U.S. Cl.
CPC ............ *G11B 27/28* (2013.01); *G11B 27/105* (2013.01); *H04N 5/76* (2013.01); *H04N 5/85* (2013.01);
(Continued)

(58) Field of Classification Search
CPC ........ H04N 5/85; H04N 9/8042; H04N 5/913; H04N 2005/91314; G11B 27/105;
(Continued)

(56) References Cited

U.S. PATENT DOCUMENTS 8,201,197 B1 6/2012 Holliday et al.
2001/0030661 A1 10/2001 Reichardt
(Continued)

FOREIGN PATENT DOCUMENTS

EP 0648054 A2 4/1995
JP H09172597 A 6/1997

OTHER PUBLICATIONS

International Search Report dated Apr. 15, 2016 issued in connection with International Application No. PCT/US2015/067345, filed on Dec. 22, 2015, 4 pages.
(Continued)

*Primary Examiner* — William Tran
(74) *Attorney, Agent, or Firm* — McDonnell Boehnen Hulbert & Berghoff LLP

(57) ABSTRACT

In one aspect, an example method involves a computing device accessing first data representing a program schedule of a media program; accessing second data representing closed-captioning text of the media program; making a determination that first text of the program schedule has at least a threshold extent of similarity with second text of the closed-captioning text, where a portion of the media program was recorded proximate a time when a portion of the second data representing the second text of the closed-captioning text was generated; using the first text of the program schedule as a basis to select a portion of the program schedule; and responsive to at least the determination, storing third data indicative of a correlation between the selected portion of the program schedule and the recorded portion of the media program.

20 Claims, 7 Drawing Sheets

(51) Int. Cl.
| | |
|---|---|
| *G11B 27/10* | (2006.01) |
| *H04N 5/85* | (2006.01) |
| *H04N 7/088* | (2006.01) |
| *H04N 21/482* | (2011.01) |
| *H04N 21/266* | (2011.01) |
| *H04N 21/488* | (2011.01) |
| *H04N 21/845* | (2011.01) |
| *H04N 5/76* | (2006.01) |

(52) U.S. Cl.
CPC ......... *H04N 7/0884* (2013.01); *H04N 7/0885* (2013.01); *H04N 21/26603* (2013.01); *H04N 21/4828* (2013.01); *H04N 21/4884* (2013.01); *H04N 21/8456* (2013.01)

(58) Field of Classification Search
CPC .......... G11B 27/329; G11B 2220/2562; G11B 20/00086; G11B 2220/20
USPC ................................................. 386/244, 245
See application file for complete search history.

(56) References Cited

U.S. PATENT DOCUMENTS

| | | |
|---|---|---|
| 2002/0073422 A1 | 6/2002 | Lee |
| 2003/0084443 A1 | 5/2003 | Laughlin et al. |
| 2005/0283717 A1 | 12/2005 | Giraldo et al. |
| 2007/0154171 A1 | 7/2007 | Elcock et al. |
| 2008/0282155 A1 | 11/2008 | Kempanna |
| 2009/0263098 A1 | 10/2009 | Hyun et al. |
| 2010/0205632 A1 | 8/2010 | VanDuyn et al. |
| 2011/0069230 A1* | 3/2011 | Polumbus ......... G06F 17/30746 348/468 |
| 2011/0246571 A1 | 10/2011 | Klier et al. |
| 2012/0033948 A1 | 2/2012 | Rodriguez et al. |
| 2012/0323564 A1* | 12/2012 | Fujii .................... G11B 27/105 704/9 |
| 2013/0232167 A1* | 9/2013 | Vidra ................ G06Q 30/0251 707/769 |
| 2014/0059058 A1* | 2/2014 | Ohtsuki ................ G06F 3/0237 707/750 |
| 2014/0129235 A1 | 5/2014 | Suvanto |
| 2014/0270702 A1 | 9/2014 | Hundemer et al. |
| 2015/0071604 A1* | 3/2015 | Yamashita ............ G11B 27/30 386/241 |

OTHER PUBLICATIONS

Written Opinion of the International Searching Authority dated Apr. 15, 2016 issued in connection with International Application No. PCT/US2015/067345, filed on Dec. 22, 2015, 4 pages.

Specification and Figures filed on Feb. 20, 2015 for U.S. Appl. No. 14/627,164, 33 pages.

International Search Report dated Apr. 18, 2016 issued in connection with International Application No. PCT/US2015/067382, filed on Dec. 22, 2015, 3 pages.

Written Opinion of the International Searching Authority dated Apr. 18, 2016 issued in connection with International Application No. PCT/US2015/067382, filed on Dec. 22, 2015, 4 pages.

Notice of Allowance dated Jul. 11, 2016 issued in connection with U.S. Appl. No. 14/627,164, filed Feb. 20, 2015, 10 pages.

* cited by examiner

302

In local news, 43-year old man John Doe won the lottery today. He has opted to accept the lump sum payment of 30 million dollars instead of the 20-year annuity amounting to 200 million dollars. When asked why he opted for the lump sum, John said, "I really feel like spending my winnings impulsively on the first frivolous items that pop into my head is the best thing for me right now." John's coworker Rhonda Regret claims that she gave John half of the money that John used to purchase the winning ticket, and plans to file a lawsuit for half of the prize.

FIG. 3B

In local news, 43-year old man John Doe won the lottery today. He has opted to accept the lump sum payment of 30 million dollars instead of the 20-year annuity amounting to 200 million dollars. When asked why he opted for the lump sum, John said, "I really feel like spending my winnings impulsively on the first frivolous items that pop into my head is the best thing for me right now." John's coworker Rhonda Regret claims that she gave John half of the money that John used to purchase the winning ticket, and plans to file a lawsuit for half of the prize.

FIG. 4A

In local news, 43-year old man John Doe won the lottery today. He has opted to accept the lump sum payment of 30 _billion_ dollars instead of the 20-year annuity amounting to 200 million dollars. When asked why he opted for the lump sum, John said, "I really feel like spending my winnings impulsively on the first frivolous items that _pip_ into my head is the best thing for me right now." John's coworker Rhonda _regret_ claims that she _give_ John half of the money that John used to purchase the winning _thicket_, and plans to file a lawsuit for half of the prize.

FIG. 4B

USE OF PROGRAM-SCHEDULE TEXT AND CLOSED-CAPTIONING TEXT TO FACILITATE SELECTION OF A PORTION OF A MEDIA-PROGRAM RECORDING

USAGE AND TERMINOLOGY

In this disclosure, unless otherwise specified and/or unless the particular context clearly dictates otherwise, each usage of "a" or "an" means at least one, and each usage of "the" means the at least one.

BACKGROUND

Unless otherwise indicated herein, the materials described in this section are not prior art to the claims in this disclosure and are not admitted to be prior art by inclusion in this section.

A media program may include multiple portions. For example, a news program may include various news stories, such as sports news stories, local news stories, national news stories, weather reports, etc. In some instances, the media program may be recorded for later viewing and/or listening. Also, in some instances, it may be useful to select from the recording, a particular portion of the media program so that the selected portion may be used independently of the rest of the recording.

SUMMARY

In a first aspect, an example method involves a computing device accessing first data representing a program schedule of a media program; the computing device accessing second data representing closed-captioning text of the media program; the computing device making a determination that first text of the program schedule has at least a threshold extent of similarity with second text of the closed-captioning text, where a portion of the media program was recorded proximate a time when a portion of the second data representing the second text of the closed-captioning text was generated; the computing device using the first text of the program schedule as a basis to select a portion of the program schedule; and responsive to at least the determination, the computing device storing third data indicative of a correlation between the selected portion of the program schedule and the recorded portion of the media program.

In a second aspect, an example non-transitory computer-readable medium has stored thereon instructions that when executed cause a computing device to perform a set of acts involving accessing first data representing a program schedule of a media program; accessing second data representing closed-captioning text of the media program; making a determination that first text of the program schedule has at least a threshold extent of similarity with second text of the closed-captioning text, where a portion of the media program was recorded proximate a time when a portion of the second data representing the second text of the closed-captioning text was generated; using the first text of the program schedule as a basis to select a portion of the program schedule; and responsive to at least the determination, storing third data indicative of a correlation between the selected portion of the program schedule and the recorded portion of the media program.

In a third aspect, an example computing device includes a processor, a communication interface, and a non-transitory computer-readable medium having instructions stored thereon that when executed by the processor cause performance of a set of acts including accessing first data representing a program schedule of a media program; accessing second data representing closed-captioning text of the media program; making a determination that first text of the program schedule has at least a threshold extent of similarity with second text of the closed-captioning text, where a portion of the media program was recorded proximate a time when a portion of the second data representing the second text of the closed-captioning text was generated; using the first text of the program schedule as a basis to select a portion of the program schedule; and responsive to at least the determination, storing third data indicative of a correlation between the selected portion of the program schedule and the recorded portion of the media program.

These, as well as other aspects, alternatives, and advantages, will become apparent to those of ordinary skill in the art by reading the following detailed description, with reference where appropriate to the accompanying drawings.

BRIEF DESCRIPTION OF THE DRAWINGS

FIG. 3B depicts a portion of the example program schedule of FIG. 3A in greater detail;

FIG. 4A depicts example closed-captioning text displayed by a display component;

FIG. 4B depicts another example of closed-captioning text displayed by a display component.

DETAILED DESCRIPTION

I. Overview

As noted above, it may be desirable to select from a recording of a media program a portion representing a particular portion of the media program. One way to select the portion may be for an editor to view the recording and to indicate when the portion begins and ends. For example, the editor may mark beginning and ending video frames of the portion. However, this process may be burdensome and time-consuming.

To help improve this process, a computing device may correlate portions of a program schedule of the media program with respective portions of the recording. A program schedule of a media program is a schedule or a summary of the media program, and is typically used to facilitate the production of the media program, such as by coordinating the use of various media-content items. In one example, the program schedule may include text corresponding to a sequence of media-program portions (e.g., news stories) that make up the media program, or may include text for an anchorperson to read aloud as the media program progresses. By correlating portions of a program schedule of a media program with respective portions of a recording of the media program, a computing device may provide an intuitive user interface that allows a user to select a portion of the media program by selecting a portion of the program schedule.

According to the present disclosure, the computing device may correlate portions of the program schedule with respective portions of the recording based on a match (or at least a threshold extent of similarity) between text in the program schedule and closed-captioning text generated as the media program is recorded. For example, the computing device may access first data representing the program schedule and access second data representing closed-captioning text of the media program. The computing device may then make a determination that first text of the program schedule has at least a threshold extent of similarity with second text of the closed-captioning text, where a portion of the media program is recorded proximate a time when a portion of the second data representing the second text of the closed-captioning text was generated. The computing device may then use the first text of the program schedule as a basis to select a portion of the program schedule. Finally, in response to at least the determination that the first text of the program schedule has at least a threshold extent of similarity with the second text of the closed-captioning text, the computing device may store third data indicative of a correlation between the selected portion of the program schedule and the recorded portion of the media program. In one example, the stored data may be arranged in a table that maps the selected portion of the program schedule to the recorded portion of the media program.

II. Example Systems and Devices

Figure 1:
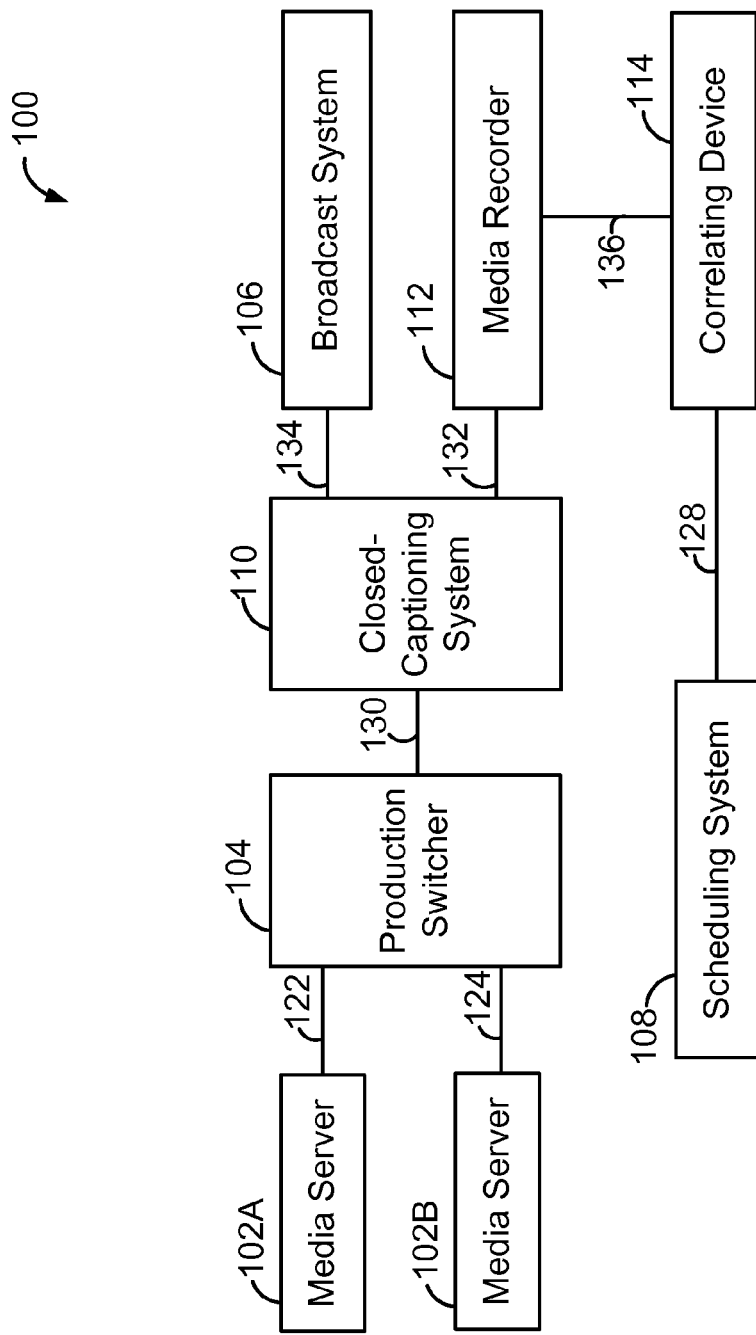
FIG. 1 is a simplified block diagram of an example system.

FIG. 1 is a simplified block diagram of an example system 100. The system 100 may include media servers 102A and 102B, a production switcher 104, a closed-captioning system 110, a broadcast system 106, a media recorder 112, a scheduling system 108, and a correlating device 114.

The components of the system 100 may be connected with each other and/or with other devices (or systems) via one or more communication paths. For example, a path 122 may connect the media server 102A and the production switcher 104, a path 124 may connect the media server 102B and the production switcher 104, a path 130 may connect the production switcher 104 and the closed-captioning system 110, a path 134 may connect the broadcast system 106 and the closed-captioning system 110, a path 132 may connect the closed-captioning system 110 and the media recorder 112, a path 136 may connect the media recorder 112 and the correlating device 114, and a path 128 may connect the scheduling system 108 and the correlating device 114.

Through these communication paths, a device may transmit various types of data to one or more other devices. For example, one device may transmit instructions to a second device to control the second device. As another example, one device may transit a media stream to another device. One or more of these paths may traverse a communication network. Notably, such devices may exchange data according to one or more standards or protocols. For example, one device may send data to another device in the form of a packet stream.

Generally, each of the media servers 102A and 102B is a device configured for retrieving a media file, converting the retrieved media file into a media stream, and transmitting the converted media stream to another device. For example, each of the media servers 102A and 102B may retrieve a media file from data storage or receive the media file from another device, convert the media file into a media stream, and transmit the media stream to the production switcher 104. Each of the media servers 102A and 102B may be implemented as a computing device. An example of a media server is the K2 server provided by Grass Valley™ of San Francisco, Calif.

Generally, the production switcher 104 is a device configured for using one or more received input media streams to generate an output media-stream. This may involve the production switcher 104 switching between and/or combining multiple media streams received respectively from the media servers 102A and 102B to generate a media program in the form of the output media-stream. The production switcher 104 may provide the output media-stream to the closed-captioning system 110 so that the closed-captioning system may augment the output-media stream with data representing closed-captioning text. The production switcher 104 may be implemented as a computing device. An example of a production switcher is the Vision switcher provided by Ross Video™ of Iroquois, Ontario, Canada.

Generally, the closed-captioning system 110 is configured to generate output data representing text corresponding to a media program so that the text may be displayed for viewers (e.g., hearing impaired viewers) of the media program. For example, an anchorperson of the media program may recite various terms (e.g., words or phrases) as the media program is recorded. A human captioner may provide, in real-time or near real-time, via a user-interface of the closed-captioning system 110, input that corresponds to the terms recited by the anchorperson. The closed-captioning system 110 may then generate output data representing the input provided to the closed-captioning system 110 and provide the output data as part of an augmented media stream to the broadcast system 106 for broadcast to a receiver device. The receiver device (and/or a device coupled to the receiver device) may then facilitate the display of text represented by the output data. The closed-captioning system 110 may also provide the augmented media stream to the media recorder 112 to be recorded. The closed-captioning system 110 may be implemented as a computing device.

Generally the broadcast system 106 is a system configured for broadcasting a media stream to multiple receiver devices (e.g., a television or a set-top box). The broadcast system 106 may include subsystems, such as a master-control system and an air-chain system, among other things. In one example, the broadcast system 106 may receive a media stream augmented with closed-captioning data from the closed-captioning system 110 to be broadcasted by the broadcast system 106. Generally, the media recorder 112 is a device configured for converting a media stream into a media file (this process is sometimes referred to as "recording a media stream"). In one example, the media recorder 112 may receive a media stream from the closed-captioning system 110, convert the received media-stream into a media file, and store the converted media-file in data storage. In one example, the media recorder 112 may provide the converted media-file (e.g., a media-file augmented with closed-captioning data provided by the closed-captioning system 110) to the correlating device 114. The media recorder 112 may be implemented as a computing device. An example of a media recorder is the K2 server provided by Grass Valley™ of San Francisco, Calif.

Generally, the scheduling system 108 is a system configured for performing functions related to scheduling and managing the production of a media program. For example, the scheduling system 108 may be configured for creating or editing a program schedule (sometimes referred to as a "rundown") of a media program based on input received via a user interface. The program schedule may include text representing a summary or outline of predetermined media-program portions (e.g., news stories) that make up the media program. In some examples, the scheduling system 108 may provide data representing one or more portions of the program schedule to the correlating device 114. The scheduling system 108 may be implemented as a computing device.

Generally, the correlating device 114 is a device configured for correlating portions of a program schedule of a media program to respective portions of a recording of the media program. In one example, the correlating device 114 may receive, from the media recorder 112, data representing the recorded media-program, including output data representing closed-captioning text of the media program. Further, the correlating device 114 may receive from the scheduling system 108, data representing the program schedule of the media program. The correlating device 114 may be implemented as a computing device.

Figure 2:
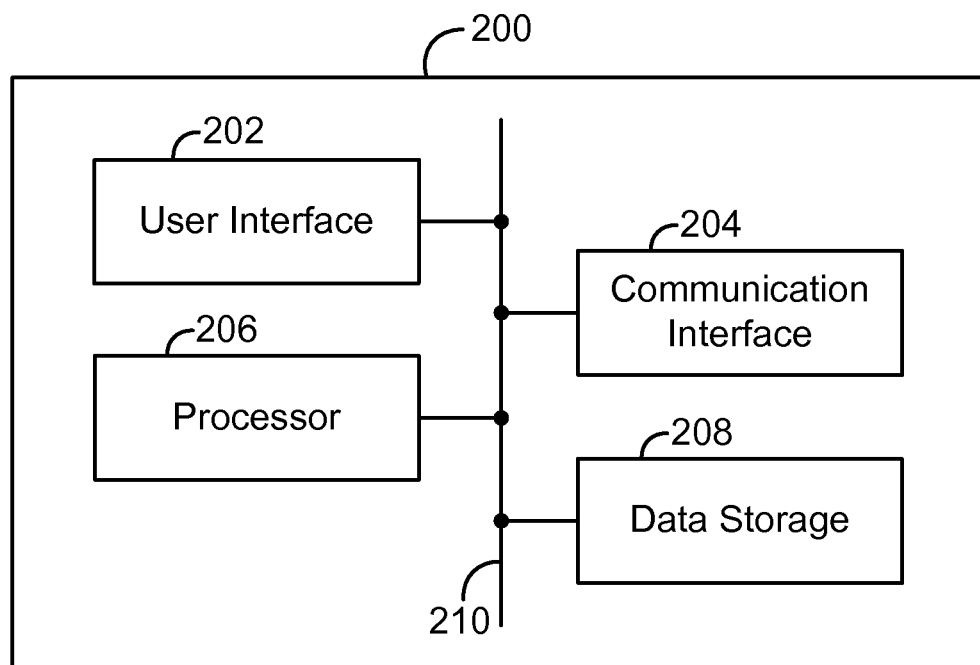
FIG. 2 is a simplified block diagram of an example computing device.

FIG. 2 is a simplified block diagram of an example computing device 200. The computing device 200 may be configured for performing a variety of functions or acts, such as those described in this disclosure (including the accompanying drawings). The computing device 200 may take a variety of forms, including for example a desktop computer, a laptop computer, a tablet computer, or a mobile phone. The computing device 200 may include various components, including for example, a user interface 202, a communication interface 204, a processor 206, and a data storage 208, all of which may be communicatively linked to each other via a system bus, network, or other connection mechanism 210.

The user interface 202 may facilitate interaction with a user of the computing device 200, if applicable. As such, the user interface 202 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system.

The communication interface 204 may take a variety of forms and may be configured to allow the computing device 200 to communicate with one or more devices or systems according to one or more protocols. In one example, the communication interface 204 may take the form of a wired interface, such as an Ethernet interface or an HD-SDI port. As another example, the communication interface 204 may take the form of a wireless interface, such as a cellular or WI-FI interface.

The processor 206 may include a general purpose processor (e.g., a microprocessor) and/or a special purpose processor (e.g., a digital signal processor (DSP)).

The data storage 208 may include one or more volatile, non-volatile, removable, and/or non-removable storage components, such as magnetic, optical, or flash storage, and may be integrated in whole or in part with the processor 206. Further, the data storage 208 may take the form of a non-transitory computer-readable storage medium, having stored thereon program instructions (e.g., compiled or non-compiled program logic and/or machine code) that, when executed by the processor 206, cause the computing device 200 to perform one or more functions or acts, such as those described in this disclosure. Such program instructions may define or be part of a discrete software application that can be executed in response to certain inputs received from the user interface 202, for instance. The data storage 208 may also store other types of information or data, such as those types described throughout this disclosure.

III. Example Program Schedule

Figure 3A:
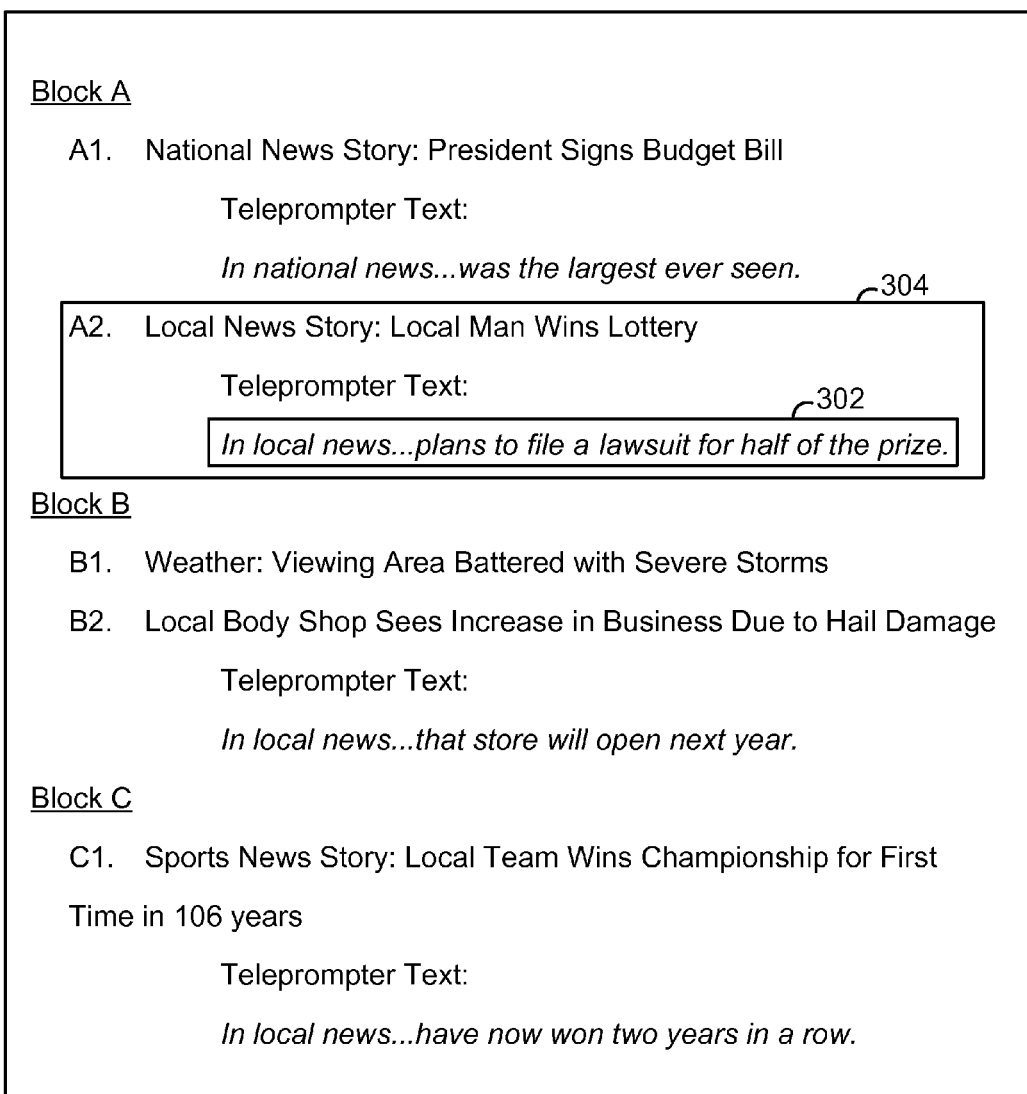
FIG. 3A depicts an example program schedule of a media program in a condensed format.

FIG. 3A depicts an example program schedule 300 of a media program in a condensed format. The program schedule 300 may be broken into blocks of media-program portions. For example, Block A may include news stories A1 and A2, Block B may include news stories B1 and B2, and Block C may include news story C1. As shown, the program schedule 300 may include, for news stories A1, A2, B2, and C1, respective text that is scheduled to be displayed by a teleprompter so that it can be read aloud by an anchorperson. For example, the program schedule 300 may include, for news story A2, text 302. (A particular portion 304 of the program schedule 300 is discussed below in section V.)

FIG. 3B depicts a portion of the example program schedule 300 in greater detail. In particular, FIG. 3B depicts the text 302.

IV. Example Closed-Captioning System Output

FIG. 4A depicts example closed-captioning text 402 displayed by a display component (e.g., of a television) 400. The closed-captioning text 402 may be represented by data generated by the closed-captioning system 110 of FIG. 1. In a typical example, the data generated by the closed-captioning system 110 is generated in real-time or near real-time as the represented terms are recited by the anchorperson of the media program, such that the closed-captioning text 402 may be displayed by the display component 400 a short time after the anchorperson recites the represented terms. Accordingly, new text may replace the closed-captioning text 402 within the display component 400 as the (live or pre-recorded) media program progresses.

FIG. 4B depicts another example of closed-captioning text 452 displayed by the display component 400. The closed-captioning text 452 may be represented by data generated by the closed-captioning system 110 of FIG. 1. In this example, the closed-captioning text 452 includes transcription errors representing deviations from what the anchorperson actually recited during the media program. Such portions of the closed-captioning text 452 that respectively represent transcription errors from the program schedule 300 are underlined in FIG. 4B for emphasis. Note that discrepancies between the closed-captioning text 452 and the program schedule may exist for other reasons as well, such as an anchorperson deviating from the text of the program schedule.

V. Example Operations

Figure 5:
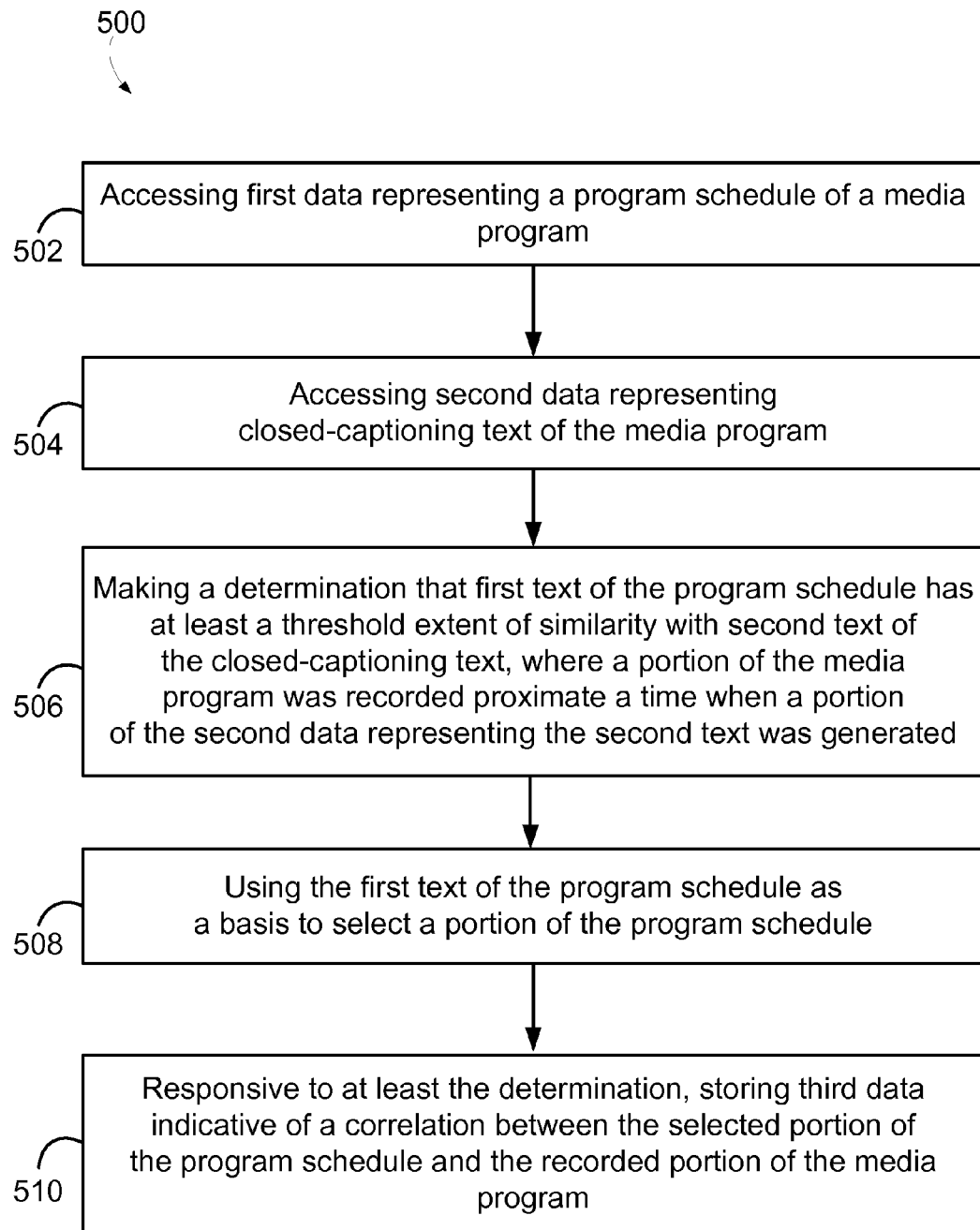
FIG. 5 is a flow diagram of an example method.

FIG. 5 is a flow chart depicting acts that can be carried out in an example method 500.

At block 502, the method 500 involves a computing device accessing first data representing a program schedule of a media program. This may involve accessing the first data from a data storage device. In another example, this may involve receiving the first data from a scheduling system. The first data may be accessed from other sources as well. In one example, the act at block 502 may involve the correlating device 114 accessing first data representing the program schedule 300 from the scheduling system 108.

At block 504, the method 500 involves the computing device accessing second data representing closed-captioning text of the media program. This may involve accessing the second data from a data storage device. In another example, this may involve receiving the second data from a media recorder. The second data may be accessed from other sources as well. In one example, the act at block 504 may involve the correlating device 114 accessing second data representing closed-captioning text 402 from the media recorder 112. In another example, the act at block 504 may involve the correlating device 114 accessing second data representing closed-captioning text 452 from the media recorder 112.

At block 506, the method 500 involves the computing device making a first determination that first text of the program schedule has at least a threshold extent of similarity with second text of the closed-captioning text. The first text may be text of the program schedule, where the text is scheduled to be recited by an anchorperson of the media program. For instance, the first text may be the text 302. In another example, the first text may be text of the program schedule 300 that is not scheduled to be recited by the anchorperson (e.g., a title of a news story listed in the program schedule 300.) The second text may be all or some of the closed-captioning text being displayed by the display component 400 at a given time. For instance, the second text may be the text 402 or the text 452. Also, a portion of the media program may be recorded proximate a time when a portion of the second data representing the second text of the closed-captioning text was generated.

In one example, the act at block 506 may involve the correlating device 114 making a first determination that the text 302 has at least a threshold extent of similarity with the text 402 displayed by the display component 400, where a portion of the media program was recorded proximate a time when a portion of the second data representing the text 402 was generated. In another example, the act at block 506 may involve the correlating device 114 making a first determination that the text 302 has at least a threshold extent of similarity with the text 452 displayed by the display component 400, where a portion of the media program was recorded proximate a time when a portion of the second data representing the text 452 was generated.

The act of making the first determination may take a variety of forms. In one example, making the first determination may involve determining that at least a threshold amount of words of the first text respectively match words of the second text. In another example, making the first determination may involve determining that the words of the first text that respectively match the words of the second text have the same sequence as the words of the second text. For instance, the correlating device 114 may determine that a threshold amount of words of the first text 302 respectively match words of the second text 402. More specifically, the correlating device 114 may determine that all of the words of the first text 302 respectively match corresponding words of the second text 402.

By further example, the correlating device 114 may determine that at least a threshold amount of words of the first text 302 respectively match words of the second text 452. More specifically, the correlating device 114 may determine that even though the first text 302 does not include words respectively exactly matching the words "billion," "pip," "regret," "give," and "thicket" of the second text 452, at least a threshold amount (e.g., 75%) of words of the first text 302 respectively match words of the second text 452.

By further example, the correlating device 114 may determine that respective first words of the first text 302 and the second text 452 are both "In," respective second words of the first text 302 and the second text 452 are both "local," respective third words of the first text 302 and the second text 452 are both "news," and so on.

As another example, making the first determination may involve determining that a first word of the first text matches a second word of the second text but for a misspelling of the second word. For example, the word "pop" of the first text 302 may be determined to match the misspelled word "pip" of the second text 452.

As still another example, making the first determination may further involve determining that a first word of the first text matches a second word of the second text but for a difference in verb tense between the first word and the second word. For example, the word "gave" of the first text 302 may be determined to match the word "give" of the second text 452.

As yet another example, making the first determination may involve determining that a first word of the first text matches a second word of the second text but for a difference in capitalization of at least one letter included in both the first word and the second word. For example, the word "Regret" of the first text 302 may be determined to match the word "regret" of the second text 452.

At block 508, the method 500 involves the computing device using the first text of the program schedule as a basis to select a portion of the program schedule. This may involve selecting a portion of the program schedule based on the first text being included within that portion. In one example, the portion may consist of text and other information associated with a particular news story. In one example, the act at block 508 may involve the correlating device 114 using the text 302 as a basis to select the portion 304 of the program schedule 300, where the portion 304 represents a portion associated with the news story A2.

At block 510, the method 500 includes, responsive to at least the first determination, the computing device storing third data indicative of a correlation between the selected portion of the program schedule and the recorded portion of the media program. This may involve storing a memory address where data representing the selected portion of the program schedule may be accessed, or storing data representing the selected portion itself. Further, this may involve storing a memory address where data representing the recorded portion of the media program may be accessed, or storing data representing one or more video frames constituting the recorded portion of the media program. In one example, the recorded portion of the media program may be an initial frame of a news story, but alternatively could include some or all of the frames representing the news story. In one example, the act at block 510 may involve responsive to at least the first determination, storing data indicative of a correlation between the portion 304 of the program schedule 300 and the recorded portion of the media program (that was displayed proximate the time the data representing the text 402 (or the text 452) was generated by the closed-captioning system 110).

Using this data, the correlating device 114 may provide an intuitive user interface that allows a user to select the recorded portion of the media program by selecting the portion 304 of the program schedule 300. For example, the correlating device 114 may provide in the portion 304 of the program schedule 300, a hyperlink that references a memory location where data representing the recorded portion of the media program is stored, thus allowing a user to click the link within the program schedule 300 and be directed to the corresponding recorded portion of the media program.

Further acts related to the method 500 may include the computing device making a second determination that the recorded portion of the media program was recorded proximate the time when the portion of the second data representing the second text was generated. In one example, the correlating device 114 may receive, from the media recorder 112, data representing the recorded portion of the media program. The correlating device 114 may then determine that the recorded portion of the media program was recorded proximate the time when the portion of the data representing the text 402 (or the text 452) was displayed by the display component 400. For example, the correlating device 114 may (i) receive the data representing the recorded portion contemporaneously while receiving data representing the text 402 (or the text 452) from the media recorder 112, or (ii) compare timestamps respectively associated with the recorded data and data representing the text 402 (or the text 452). In one example, the correlating device 114 may be configured to associate data representing closed-captioning text with data representing portions of the recording that were previously received by the correlating device 114, thereby accounting for a time lag that occurs between a captioner hearing the anchorperson's recitation and the captioner providing corresponding input to the closed-captioning system 110. In this context, the stored data indicative of the correlation between the selected portion of the program schedule and the recorded portion of the media program may be stored responsive to the second determination (in addition to being stored responsive to the first determination).

Further acts related to the method 500 may involve the computing device receiving an indication of the selected portion of the program schedule; the computing device using the received indication and the stored third data to select the recorded portion of the media program; and the computing device displaying at least a portion of the selected recorded-portion of the media program. For example, the correlating device 114 may receive an indication (e.g., a mouse click input) of a hyperlink corresponding to the selected portion of the program schedule. The correlating device 114 may then query a data table that maps the selected portion of the program schedule to the recorded portion of the media program (or a memory address of the recorded portion of the media program). In this way, the correlating device 114 may select the recorded portion of the media program so that the correlating device 114 may display at least a portion (e.g., an initial frame) of the recorded portion of the media program. For example, it may be useful to "cue" the recording of the media program to what has been determined to be an initial frame of a news story, so that an editor may easily select a larger portion of the recording to be associated with the news story.

VI. Example Variations

The variations described in connection with select examples of the disclosed systems, devices, and methods may be applied to all other examples of the disclosed systems, devices, and methods.

Further, while one or more acts have been described as being performed by or otherwise related to certain systems or devices (e.g., the correlating device 114), the acts may be performed by or be otherwise related to any system or device.

Further, the acts need not be performed in the disclosed order, although in some examples, an order may be preferred. Also, not all acts need to be performed to achieve the desired advantages of the disclosed systems, devices, and methods, and therefore not all acts are required.

While select examples of the present disclosure have been described, alterations and permutations of these examples will be apparent to those of ordinary skill in the art. Other changes, substitutions, and alterations are also possible without departing from the invention in its broader aspects as set forth in the following claims.

The invention claimed is:

1. A method comprising:
   a computing device accessing first data representing a program schedule of a media program;
   the computing device accessing second data representing closed-captioning text of the media program;
   the computing device making a determination that first text of the program schedule has at least a threshold extent of similarity with second text of the closed-captioning text, wherein a portion of the media program was recorded proximate a time when a portion of the second data representing the second text of the closed-captioning text was generated;
   the computing device using the first text of the program schedule as a basis to select a portion of the program schedule; and
   responsive to at least the determination, the computing device storing third data indicative of a correlation between the selected portion of the program schedule and the recorded portion of the media program.

2. The method of claim 1, wherein the determination is a first determination, the method further comprising:
   the computing device making a second determination that the recorded portion of the media program was recorded proximate the time when the portion of the second data representing the second text of the closed-captioning text was generated,
   wherein responsive to at least the first determination comprises responsive to at least the first and second determinations.

3. The method of claim 1, wherein the media program comprises multiple news-stories, wherein the selected portion of the program schedule corresponds to a particular news story of the multiple news-stories, and wherein the recorded portion of the media program comprises an initial frame of the particular news story.

4. The method of claim 1, further comprising:
   the computing device receiving an indication of the selected portion of the program schedule;
   the computing device using the received indication and the stored third data to select the recorded portion of the media program; and
   the computing device displaying at least a portion of the selected recorded-portion of the media program.

5. The method of claim 1, wherein making the determination comprises determining that at least a threshold amount of words of the first text respectively match words of the second text.

6. The method of claim 5, wherein making the determination further comprises determining that the words of the first text that respectively match the words of the second text have the same sequence as the words of the second text.

7. The method of claim 1, wherein making the determination comprises determining that a first word of the first text matches a second word of the second text but for a misspelling of the second word.

8. The method of claim 1, wherein making the determination comprises determining that a first word of the first text matches a second word of the second text but for a difference in verb tense between the first word and the second word.

9. The method of claim 1, wherein making the determination comprises determining that a first word of the first text matches a second word of the second text but for a difference in capitalization of at least one letter included in both the first word and the second word.

10. A non-transitory computer-readable medium having instructions stored thereon that when executed cause a computing device to perform a set of acts comprising:
    accessing first data representing a program schedule of a media program;
    accessing second data representing closed-captioning text of the media program;
    making a determination that first text of the program schedule has at least a threshold extent of similarity with second text of the closed-captioning text, wherein a portion of the media program was recorded proximate a time when a portion of the second data representing the second text of the closed-captioning text was generated;

using the first text of the program schedule as a basis to select a portion of the program schedule; and responsive to at least the determination, storing third data indicative of a correlation between the selected portion of the program schedule and the recorded portion of the media program.

11. The non-transitory computer-readable medium of claim 10, wherein the determination is a first determination, the set of acts further comprising:

making a second determination that the recorded portion of the media program was recorded proximate the time when the portion of the second data representing the second text was generated, wherein responsive to at least the first determination comprises responsive to at least the first and second determinations.

12. The non-transitory computer-readable medium of claim 10, wherein the media program comprises multiple news-stories, wherein the selected portion of the program schedule corresponds to a particular news-story of the multiple news-stories, and wherein the recorded portion of the media program comprises an initial frame of the particular news-story.

13. The non-transitory computer-readable medium of claim 10, the set of acts further comprising:

receiving an indication of the selected portion of the program schedule;

using the received indication and the stored third data to select the recorded portion of the media program; and displaying at least a portion of the selected recorded-portion of the media program.

14. The non-transitory computer-readable medium of claim 10, wherein making the determination comprises determining that at least a threshold amount of words of the first text respectively match words of the second text.

15. The non-transitory computer-readable medium of claim 14, wherein making the determination further comprises determining that the words of the first text that respectively match the words of the second text have the same sequence as the words of the second text.

16. A computing device comprising:
a processor;
a communication interface; and
a non-transitory computer-readable medium having instructions stored thereon that when executed by the processor cause performance of a set of acts comprising:

accessing first data representing a program schedule of a media program;

accessing second data representing closed-captioning text of the media program;

making a determination that first text of the program schedule has at least a threshold extent of similarity with second text of the closed-captioning text, wherein a portion of the media program was recorded proximate a time when a portion of the second data representing the second text of the closed-captioning text was generated;

using the first text of the program schedule as a basis to select a portion of the program schedule; and responsive to at least the determination, storing third data indicative of a correlation between the selected portion of the program schedule and the recorded portion of the media program.

17. The computing device of claim 16, wherein making the determination comprises determining that a first word of the first text matches a second word of the second text but for a misspelling of the second word.

18. The computing device of claim 16, wherein making the determination comprises determining that a first word of the first text matches a second word of the second text but for a difference in verb tense between the first word and the second word.

19. The computing device of claim 16, wherein making the determination comprises determining that a first word of the first text matches a second word of the second text but for a difference in capitalization of at least one letter included in both the first word and the second word.

20. The computing device of claim 16, wherein the determination is a first determination, the set of acts further comprising:

making a second determination that the recorded portion of the media program was recorded proximate the time when the portion of the second data representing the second text was generated, wherein responsive to at least the first determination comprises responsive to at least the first and second determinations.

* * * * *